Patented Nov. 10, 1953

2,658,981

UNITED STATES PATENT OFFICE 2,658,981

WELDING BERYLLIUM AND BERYLLIUM ALLOYS

David C. Martin, Worthington, Ohio, assignor to the United States of America as represented by the United States Atomic Energy Commission No Drawing. Application August 8, 1950, Serial No. 178,356

12 Claims. (Cl. 219—10)

This invention deals with a process for welding beryllium-base metals, i. e., alloys having a predominant content of beryllium; this definition is also intended to include pure beryllium metal. In particular, this invention relates to the welding of beryllium-base metals by an inert gas-shielded arc welding process.

It is an object of this invention to provide a process for welding beryllium-base metals in which no oxidation of the base metal or a filler rod takes place.

It is another object of this invention to provide a process for welding beryllium-base metals by which a practically nonporous and crackless weld is obtained.

It is another object of this invention to provide a process for welding beryllium-base metals by which a weld is obtained that has a high degree of strength and which is at least as strong as the base metal.

It is finally still another object of this invention to provide a gas mixture in which the ingredients cooperate to bring about the above objects.

These and other objects are accomplished by welding the berrylium-base metals in an atmosphere containing an inert shield gas and a fluorochlorohydrocarbon as a fluxing agent.

All kinds of fluorochlorohydrocarbons are suitable for the process of this invention, and in particular have the fluorochlorohydrocarbons been found advantageous which are known under the trade name of "Freon"; they are fluorochloromethanes and fluorochloroethanes manufactured and sold by Kinetic Chemicals, Inc. The best results were obtained with "Freon 12" or just "Freon" as it is often referred to, which is difluorodichloromethane.

All inert gases such as helium, argon, and others are suitable as the shield gas; however, argon was preferred for the process of this invention.

The rate of flow of the gases is not critical as long as the atmosphere is maintained free from oxygen and sufficient fluorochlorohydrocarbon is present. A quantity of from 0.5 to 5% by volume of the flux gas with regard to the mixture has been found suitable; from 0.5 to 2%, however, was preferred.

Various kinds of electrodes may be used for the production of the arc in the process of this invention. Tungsten electrodes and aluminum electrodes, for instance, have been found suitable; however, carbon electrodes gave the highest satisfaction, because they show a great resistance to the fluxing agent.

A filler rod may be used in the process of this invention, and materials suitable therefor are aluminum- or beryllium-base metals, preferably of a similar composition as that of the base metal.

Alternating current, as well as direct current, either straight- or reversed-polarity, is suitable for the process of this invention; however, straight-polarity direct current was preferred.

Atmospheric pressure, as well as superatmospheric pressure, is satisfactory for the welding process; it was found that the results obtained by using superatmospheric pressure, however, are hardly superior to those obtained with atmospheric pressure so that, for economical reasons, atmospheric pressure is preferred.

While the invention is applicable to all kinds of beryllium-base metal, as has been set forth above, it has been found especially valuable for welding beryllium-aluminum alloys. Tubes, rods, or beryllium-base metal articles of other shapes may be welded by the process of this invention, and the weld may be either a straight butt weld or a U-shaped butt joint. The straight butt weld was found preferable for base metals of a thickness up to ¼", while the U-shaped butt joint was preferred for thicker articles.

In the following table, the results of three experiments are compiled which were carried out with beryllium-aluminum alloys containing 3% aluminum. The thickness of the articles which were welded was ¼", and the type of the weld produced was a 90° closed butt weld. A carbon electrode and straight-polarity direct current were used in these experiments. In all three instances, the shield gas used was argon of a purity of 99.6%. While in the first experiment argon was used without a fluxing gas, the argon in experiments II and III contained difluorodichloromethane. Experiments I and II were carried out at atmospheric pressure, and experiment III at a superatmospheric pressure of 50 mm. mercury.

| Expt. | Argon, l./min. | "Freon", l./min. | Pressure | Current density, amps. | Remarks |
|---|---|---|---|---|---|
| I | 7.1 | None used | Atmospheric | 140-154 | Weld pool oxidizes badly, finally disappears; weld line unfused. |
| II | 7.1 | 0.05 | do | 190 | In controlled atmosphere chamber purged with purified argon before welding, arc stable; weld appearance good; no cracking, and a minimum of porosity. |
| III | 5.3 | 0.05 | Superatmospheric 50 mm. Hg. | 190 | Exceptionally clean pool under arc; penetration 100% with smooth back on joint; no or very little porosity; no cracks. |

The "remarks" in the table, which discuss the results of the experiments, show that by using "Freon" as a fluxing gas, the welding process is greatly improved and that crackless and practically nonporous welds are obtained. The table also shows that the use of superatmospheric pressure does not yield any noticeable improvement.

It will be understood that this invention is not to be limited to the details given herein but that it may be modified within the scope of the appended claims.

What is claimed is:

1. A process of welding beryllium-base metals comprising welding said metals using a shield gas consisting of from 95 to 99.5% by volume of a noble gas and from 5 to 0.5% by volume of a fluorochlorohydrocarbon selected from the group consisting of fluorochloromethanes and fluorochloroethanes.

2. The process of claim 1 wherein the quantities of noble gas and fluorochlorohydrocarbon are from 98 to 99.5 and from 2 to 0.5%, respectively.

3. The process of claim 1 wherein the noble gas is argon.

4. The process of claim 3 wherein the shield gas consists of 99.3% by volume of argon and 0.7% by volume of difluorodichloromethane.

5. The process of claim 1 wherein welding is carried out by arc welding.

6. The process of claim 5 wherein straight-polarity direct current is used.

7. The process of claim 6 wherein welding is carried out with a carbon electrode.

8. The process of claim 5 wherein welding is carried out under atmospheric pressure.

9. As a new composition of matter, a shield gas for welding beryllium-base metals consisting of from 95 to 99.5% by volume of a noble gas and from 5 to 0.5% by volume of a fluorochlorohydrocarbon selected from the group consisting of fluorochloromethanes and fluorochloroethanes.

10. The composition of matter of claim 9 wherein the noble gas is argon.

11. The composition of matter of claim 9 wherein the fluorochlorohydrocarbon is difluorodichloromethane.

12. The composition of matter of claim 9 wherein the shield gas consists of from 98 to 99.5% by volume of noble gas and from 2 to 0.5% by volume of the fluorochlorohydrocarbon.

DAVID C. MARTIN.

References Cited in the file of this patent

UNITED STATES PATENTS

| Number | Name | Date |
|---|---|---|
| 1,955,345 | Sarnmark | Apr. 17, 1934 |
| 2,040,912 | Zellhoefer | May 19, 1936 |
| 2,041,045 | Carrier et al. | May 19, 1936 |
| 2,283,666 | Calcott | May 19, 1942 |

OTHER REFERENCES

Crockett, "Some Industrial Uses of Nitrogen and the Rare Gases," Metal Progress, Dec. 1948, pp. 834–836 and 836–890.